US011736966B2

(12) United States Patent
Marupaduga et al.

(10) Patent No.: US 11,736,966 B2
(45) Date of Patent: Aug. 22, 2023

(54) SIMULTANEOUS WIRELESS COMMUNICATION SERVICE OVER FIFTH GENERATION NEW RADIO (5GNR) AND LONG TERM EVOLUTION (LTE)

(71) Applicant: T-Mobile Innovations LLC, Overland Park, KS (US)

(72) Inventors: Sreekar Marupaduga, Overland Park, KS (US); Ravi Varma Kallepalli, Overland Park, KS (US); Rajveen Narendran, Olathe, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 149 days.

(21) Appl. No.: 17/307,652

(22) Filed: May 4, 2021

(65) Prior Publication Data
US 2021/0258815 A1  Aug. 19, 2021

Related U.S. Application Data

(63) Continuation of application No. 16/546,171, filed on Aug. 20, 2019, now Pat. No. 11,032,729.

(51) Int. Cl.
H04W 76/27 (2018.01)
H04W 24/10 (2009.01)
(Continued)

(52) U.S. Cl.
CPC ........ *H04W 24/10* (2013.01); *G06F 9/45558* (2013.01); *H04W 76/27* (2018.02);
(Continued)

(58) Field of Classification Search
CPC .................. H04W 24/10; H04W 80/08; G06F 2009/45595
See application file for complete search history.

(56) References Cited

U.S. PATENT DOCUMENTS 10,251,082 B2   4/2019  Gu et al.
11,303,404 B2 *  4/2022  Hosseini ............... H04L 5/0082
(Continued)

FOREIGN PATENT DOCUMENTS

WO   2018004278 A1   1/2018
WO   2018009608 A1   1/2018
(Continued)

*Primary Examiner* — Fahmida S Chowdhury

(57) ABSTRACT

In a wireless access node, Packet Data Convergence Protocol (PDCP) circuitry identifies a noise metric for the wireless access node. The PDCP circuitry receives Downlink (DL) user data for User Equipment (UE). The PDCP circuitry allocates a first portion of the DL data and a second portion of the DL data based on the noise metric. The PDCP circuitry transfers the first portion of the DL data over first Radio Link Control (RLC) circuitry to first MAC circuitry. The PDCP circuitry transfers the second portion of the DL data over second RLC circuitry to second MAC circuitry. The first MAC circuitry schedules wireless delivery of the first portion of the DL data and transfers the first portion of the DL data to the UE over first Physical Layer (PHY) circuitry. The second MAC circuitry schedules wireless delivery of the second portion of the DL data and transfers the second portion of the DL data to the UE over second PHY circuitry.

20 Claims, 8 Drawing Sheets

(51) Int. Cl.
*H04W 80/08* (2009.01)
*G06F 9/455* (2018.01)
*H04W 80/02* (2009.01)

(52) U.S. Cl.
CPC ........... *H04W 80/02* (2013.01); *H04W 80/08* (2013.01); *G06F 2009/45595* (2013.01)

(56) References Cited

U.S. PATENT DOCUMENTS

| | | | | |
|---|---|---|---|---|
| 2007/0281695 A1* | 12/2007 | Lohr | ................... | H04W 72/20 455/442 |
| 2015/0146662 A1* | 5/2015 | Bi | ...................... | H04L 41/0816 370/329 |
| 2016/0088542 A1* | 3/2016 | Belghoul | .......... | H04W 28/0231 370/331 |
| 2017/0048086 A1* | 2/2017 | Subramanian | ...... | H04L 27/2646 |
| 2017/0064671 A1* | 3/2017 | Rashid | ................. | H04W 68/02 |
| 2018/0035307 A1* | 2/2018 | Mahimkar | .............. | H04L 43/08 |
| 2018/0176902 A1* | 6/2018 | Huang | .............. | H04W 72/0446 |
| 2018/0359742 A1* | 12/2018 | Patel | ..................... | H04W 72/23 |
| 2018/0368199 A1 | 12/2018 | Zeng et al. | | |
| 2019/0149184 A1 | 5/2019 | Jung et al. | | |
| 2019/0158137 A1* | 5/2019 | Brunel | ................. | H04B 1/0064 |
| 2019/0159273 A1* | 5/2019 | Shi | ........................ | H04W 76/15 |
| 2019/0159274 A1 | 5/2019 | Hong et al. | | |
| 2019/0200407 A1 | 6/2019 | Shi et al. | | |
| 2019/0261327 A1* | 8/2019 | Hosseini | ............... | H04L 5/0051 |
| 2019/0335521 A1* | 10/2019 | Shi | ........................ | H04W 80/08 |
| 2019/0379455 A1* | 12/2019 | Wang | ............... | H04B 10/25753 |
| 2020/0053755 A1* | 2/2020 | Ang | .................. | H04W 72/0453 |
| 2020/0351788 A1* | 11/2020 | Landis | .................... | H04B 7/0695 |
| 2021/0028832 A1* | 1/2021 | Liu | ....................... | H04W 16/28 |

FOREIGN PATENT DOCUMENTS

| | | |
|---|---|---|
| WO | 2018226065 A1 | 12/2018 |
| WO | 2019050215 A1 | 3/2019 |
| WO | 2019119338 A1 | 6/2019 |

\* cited by examiner

SIMULTANEOUS WIRELESS COMMUNICATION SERVICE OVER FIFTH GENERATION NEW RADIO (5GNR) AND LONG TERM EVOLUTION (LTE)

RELATED CASES

This United States Patent Application is a continuation of U.S. patent application Ser. No. 16/546,171 that was filed on Aug. 20, 2019 and is entitled "SIMULTANEOUS WIRELESS COMMUNICATION SERVICE OVER FIFTH GENERATION NEW RADIO (5GNR) AND LONG TERM EVOLUTION (LTE)." U.S. patent application Ser. No. 16/546,171 is hereby incorporated by reference into this United States Patent Application.

TECHNICAL BACKGROUND

Wireless communication networks provide wireless data services to wireless user devices. Exemplary wireless data services include voice-calling, internet-access, media-streaming, machine communications, vehicle control, and social-networking. Exemplary wireless user devices comprise phones, computers, vehicles, robots, sensors, and drones. The wireless communication networks have wireless access nodes that exchange wireless signals with the wireless user devices using wireless network protocols. Exemplary wireless network protocols include Long Term Evolution (LTE) and Fifth Generation New Radio (5GNR). LTE is described in Third Generation Partnership Project (3GPP) Technical Specification (TS) 36. 5GNR is described in 3GPP TS 38.

A wireless access node may simultaneously serve wireless user devices over LTE and 5GNR. The wireless access node comprises an LTE access node and a 5GNR access node. The wireless communication network transfers downlink data to both the LTE access node and the 5GNR access node. The LTE access node wirelessly transfers its downlink data to the UEs. The 5GNR access node allocates its downlink data into a 5GNR portion and an LTE portion. The 5GNR access node wirelessly transfers the 5GNR portion to the UEs. The 5GNR access node transfers the LTE portion to the LTE access node, and the LTE access node wirelessly transfers the LTE portion to the UEs.

To allocate the downlink data between 5GNR and LTE, the 5GNR access node processes buffer status in the LTE access node and buffer status in the 5GNR access node. Specifically, a Packet Data Convergence Protocol (PDCP) determines buffer fill for an LTE Radio Link Control (RLC) and for a 5GNR RLC. The 5GNR PDCP allocates the downlink data to the LTE access node or to the 5GNR access node based on which access node has the fastest or emptiest RLC buffer. Although this form of 5GNR/LTE allocation mitigates RLC buffer delay, this form of 5GNR/LTE allocation does not mitigate radio interference.

TECHNICAL BACKGROUND

In a wireless access node, Packet Data Convergence Protocol (PDCP) circuitry identifies a noise metric for the wireless access node. The PDCP circuitry receives Downlink (DL) user data doe User Equipment (UE). The PDCP circuitry allocates a first portion of the DL data and a second portion of the DL data based on the noise metric. The PDCP circuitry transfers the first portion of the DL data over first Radio Link Control (RLC) circuitry to first MAC circuitry. The PDCP circuitry transfers the second portion of the DL data over second RLC circuitry to second MAC circuitry. The first MAC circuitry schedules wireless delivery of the first portion of the DL data and transfers the first portion of the DL data to the UE over first Physical Layer (PHY) circuitry. The second MAC circuitry schedules wireless delivery of the second portion of the DL data and transfers the second portion of the DL data to the UE over second PHY circuitry.

DETAILED DESCRIPTION

Figure 1:
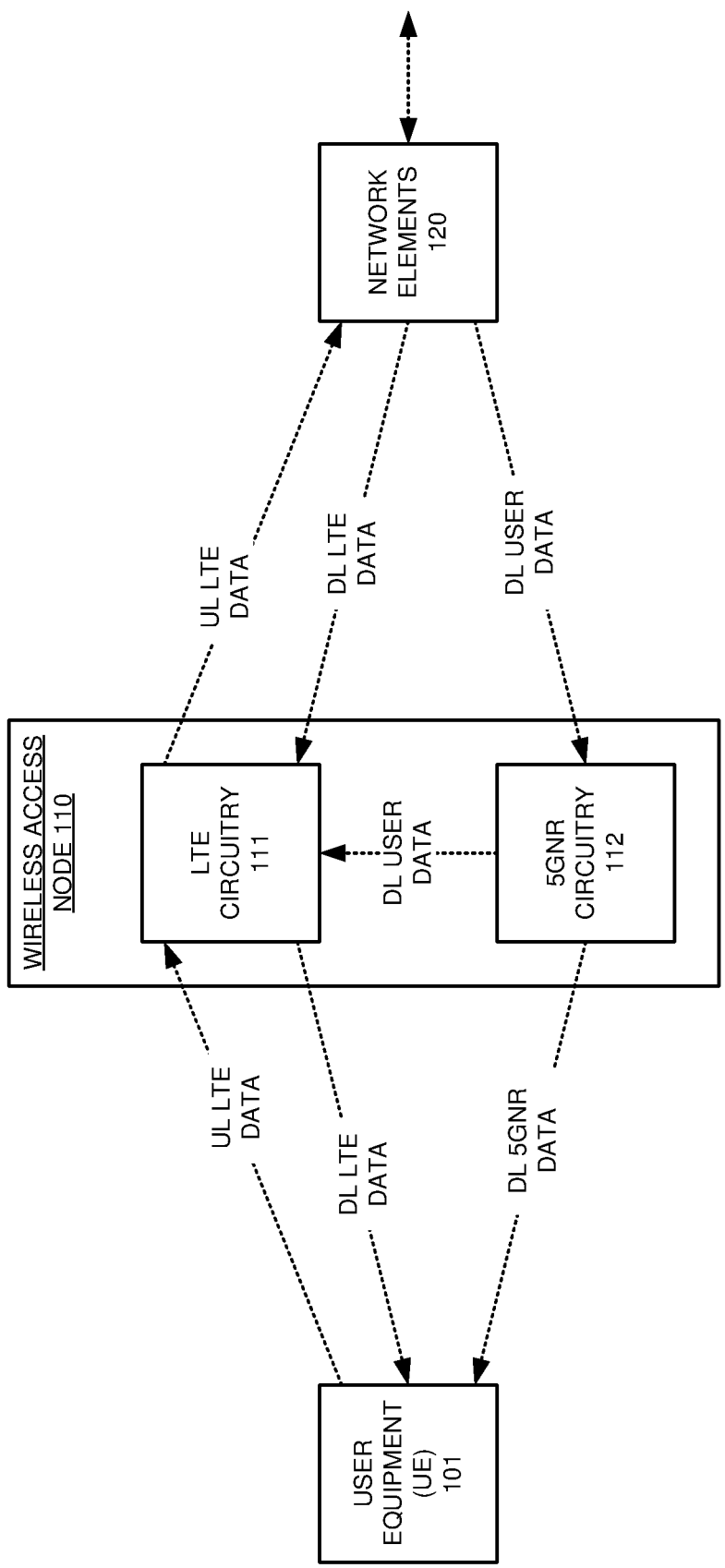
FIG. 1 illustrates a wireless communication network to simultaneously serve User Equipment (UEs) over Fifth Generation New Radio (5GNR) and Long Term Evolution (LTE).

FIG. 1 illustrates wireless communication network 100 to simultaneously serve User Equipment (UE) 101 over Long Term Evolution (LTE) and Fifth Generation New Radio (5GNR). LTE is an Orthogonal Frequency Division Multiplex (OFDM) Wide Area Network (WAN) radio technology that serves mobile devices with services like internet access, machine communications, or some other user application. LTE is described by the Third Generation Partnership Project (3GPP) Technical Specification (TS) 36. 5GNR is an OFDM WAN radio technology that provides an extension to LTE. 5GNR is described in 3GPP TS 38. LTE and 5GNR may use frequencies in the low-band, mid-band, millimeter-wave band, and/or some other part of the wireless spectrum.

Wireless communication network 100 comprises UE 101, wireless access node 110, and network elements 120. Wireless access node 110 comprises LTE circuitry 111 and 5GNR circuitry 112. LTE circuitry 111 is coupled to UE 101 over wireless LTE links. 5GNR circuitry 112 is coupled to UE 101 over wireless 5GNR links. LTE circuitry 111 is coupled to network elements 120 over LTE links, and 5GNR circuitry 112 is coupled to network elements 120 over LTE or 5GNR links. Wireless communication network 100 is restricted for clarity and typically includes more UEs and wireless access nodes than the number shown.

UE 101 comprises radio circuitry and user circuitry. UE 101 might be a phone, computer, robot, sensor, vehicle, drone, data appliance, or some other user apparatus with wireless communication circuitry. UE 101 exchanges network signaling and user data with wireless access node 110 over wireless LTE and 5GNR links. Wireless access node 110 exchanges network signaling and user data with network elements 120.

Network elements 120 may comprise a Mobility Management Entity (MME), Home Subscriber System (HSS), Serving Gateway (SGW), Packet Data Network Gateway (PGW), Access and Mobility Management Function (AMF), Session Management Function (SMF), Policy Control Function (PCF), User Plane Function (UPF), and/or some other networking components. Network elements 120 exchange network signaling and user data with wireless access node 120 over LTE and 5GNR links.

Wireless access node 110 comprises LTE circuitry 111 and 5GNR circuitry 112. LTE circuitry 111 and 5GNR circuitry 112 are coupled over data links. Circuitry 111-112 comprises antennas, modulators, amplifiers, filters, digital/analog interfaces, microprocessors, memory, software, transceivers, and bus connections. The microprocessors comprise Digital Signal Processors (DSPs), Central Processing Units (CPUs), Graphical Processing Units (GPUs), Field Programmable Gate Arrays (FPGAs), Application-Specific Integrated Circuits (ASICs), and/or the like. The memory comprises Random Access Memory (RAM), flash circuitry, disk drives, and/or the like. The memory stores software like operating systems, network applications, and virtual components. Exemplary network applications comprise Physical Layer (PHY), Media Access Control (MAC), Radio Link Control (RLC), Packet Data Convergence Protocol (PDCP), Radio Resource Control (RRC), and Service Data Adaptation Protocol (SDAP), although other network applications could be used. The microprocessors execute the operating systems and network applications to wirelessly exchange network signaling and user data with UE 101 over the LTE and 5GNR links. The microprocessors execute the operating systems and network applications to exchange network signaling and user data with network elements 120. Network elements 120 exchange some user data with external systems.

Initially, UE 101 and LTE circuitry 111 exchange network signaling over the wireless LTE links. LTE circuitry 111 and network elements 120 exchange network signaling over the other LTE links. Network elements 120 authorize UE 101 to use simultaneous LTE and 5GNR and respond to LTE circuitry 111 with session context data like authorized services, quality-of-service levels, network addresses, and the like. LTE circuitry 111 transfers the session context data to UE 101. UE 101 transfers Uplink (UL) LTE data to LTE circuitry 111, and LTE circuitry 111 transfers the UL LTE data to network elements 120. Network elements 120 transfer Downlink (DL) LTE data to LTE circuitry 111, and LTE circuitry 111 transfers the DL LTE data to UE 101. Network elements 120 also transfer DL user data to 5GNR circuitry 112.

5GNR circuitry 112 receives the DL user data. 5GNR circuitry 112 allocates the DL user data into a 5GNR portion and an LTE portion. 5GNR circuitry 112 wirelessly transfers the 5GNR portion of the DL user data to UE 101 over the 5GNR links. 5GNR circuitry 112 transfers the LTE portion of the DL user data to LTE circuitry 111 over the network links. LTE circuitry 111 wirelessly transfers the LTE portion of the DL user data to UE 101 over the LTE links.

LTE circuitry 111 and/or 5GNR circuitry 112 measure an UL noise metric for wireless access node 110. Either LTE circuitry 111 or 5GNR circuitry 112 modify the 5GNR portion and the LTE portion based on the UL noise metric for wireless access node 110. For example, 5GNR circuitry 112 may use a data structure to translate different UL noise levels into different percentage allocations for LTE/5GNR like 30/70, 50/50, 60/40, and the like. Typically, the LTE portion increases and the 5GNR portion decreases when the UL noise metric decreases. Likewise, the LTE portion typically decreases and the 5GNR portion increases when the UL noise metric increases. Advantageously, decreasing the LTE portion and increasing the 5GNR portion in this manner mitigates high UL noise.

After modifying the LTE and 5GNR portions, UE 101 transfers additional UL LTE data to LTE circuitry 111, and LTE circuitry 111 transfers the additional UL LTE data to network elements 120. Network elements 120 transfer additional DL LTE data to LTE circuitry 111, and LTE circuitry 111 transfers the additional DL LTE data to UE 101. Network elements 120 also transfer additional DL user data to 5GNR circuitry 112.

5GNR circuitry 112 allocates the additional DL user data into a modified 5GNR portion and a modified LTE portion based on the modified allocation. 5GNR circuitry 112 wirelessly transfers the modified 5GNR portion of the DL user data to UE 101 over the 5GNR links. 5GNR circuitry 112 transfers the modified LTE portion of the DL user data to LTE circuitry 111 over the network links. LTE circuitry 111 wirelessly transfers the modified LTE portion of the DL user data to UE 101 over the LTE links.

Figure 2:
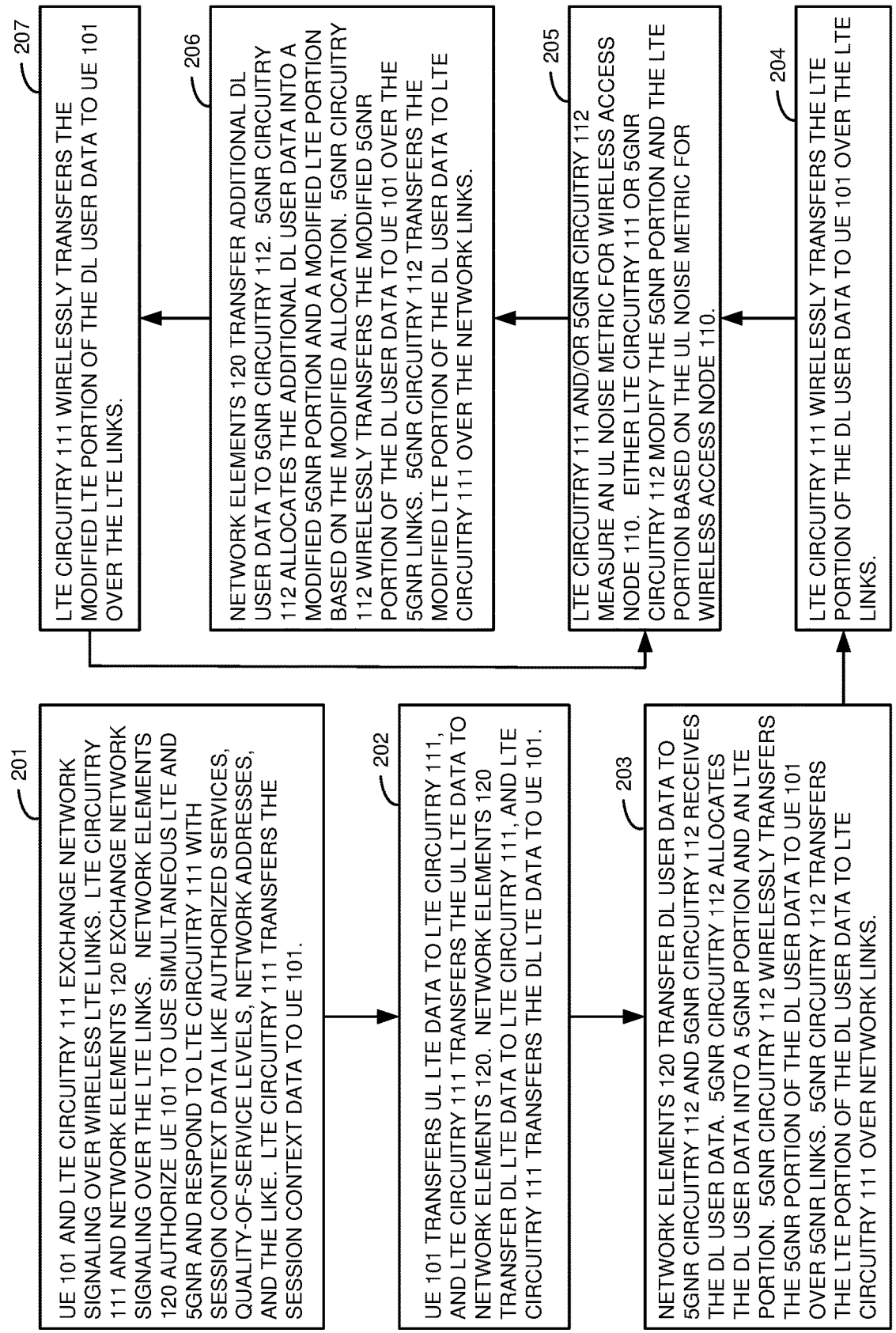
FIG. 2 illustrates the operation of the wireless communication network to simultaneously serve the UEs over 5GNR and LTE.

FIG. 2 illustrates the operation of wireless communication network 100 to simultaneously serve UE 101 over 5GNR and LTE. UE 101 and LTE circuitry 111 exchange network signaling over wireless LTE links (201). LTE circuitry 111 and network elements 120 exchange network signaling over LTE links (201). Network elements 120 authorize UE 101 to use simultaneous LTE and 5GNR and respond to LTE circuitry 111 with session context data like authorized services, quality-of-service levels, network addresses, and the like (201). LTE circuitry 111 transfers the session context data to UE 101 (201). UE 101 transfers UL LTE data to LTE circuitry 111, and LTE circuitry 111 transfers the UL LTE data to network elements 120 (202). Network elements 120 transfer DL LTE data to LTE circuitry 111, and LTE circuitry 111 transfers the DL LTE data to UE 101 (202).

Network elements 120 transfer DL user data to 5GNR circuitry 112 (203). 5GNR circuitry 112 receives the DL user data (203). 5GNR circuitry 112 allocates the DL user data into a 5GNR portion and an LTE portion (203). 5GNR circuitry 112 wirelessly transfers the 5GNR portion of the DL user data to UE 101 over the 5GNR links (203). 5GNR circuitry 112 transfers the LTE portion of the DL user data to LTE circuitry 111 over the network links (203). LTE circuitry 111 wirelessly transfers the LTE portion of the DL user data to UE 101 over the LTE links (204).

LTE circuitry 111 and/or 5GNR circuitry 112 measure an UL noise metric for wireless access node 110 (205). Either LTE circuitry 111 or 5GNR circuitry 112 modify the 5GNR portion and the LTE portion based on the UL noise metric for wireless access node 110 (205). Typically, the LTE portion decreases and the 5GNR portion increases when the UL noise metric increases. Network elements 120 transfer additional DL user data to 5GNR circuitry 112 (206). 5GNR circuitry 112 allocates the additional DL user data into a modified 5GNR portion and a modified LTE portion based on the modified allocation (206). 5GNR circuitry 112 wirelessly transfers the modified 5GNR portion of the DL user data to UE 101 over the 5GNR links (206). 5GNR circuitry 112 transfers the modified LTE portion of the DL user data to LTE circuitry 111 over the network links (206). LTE circuitry 111 wirelessly transfers the modified LTE portion of the DL user data to UE 101 over the LTE links (207). The operation repeats (205-207).

Figure 3:
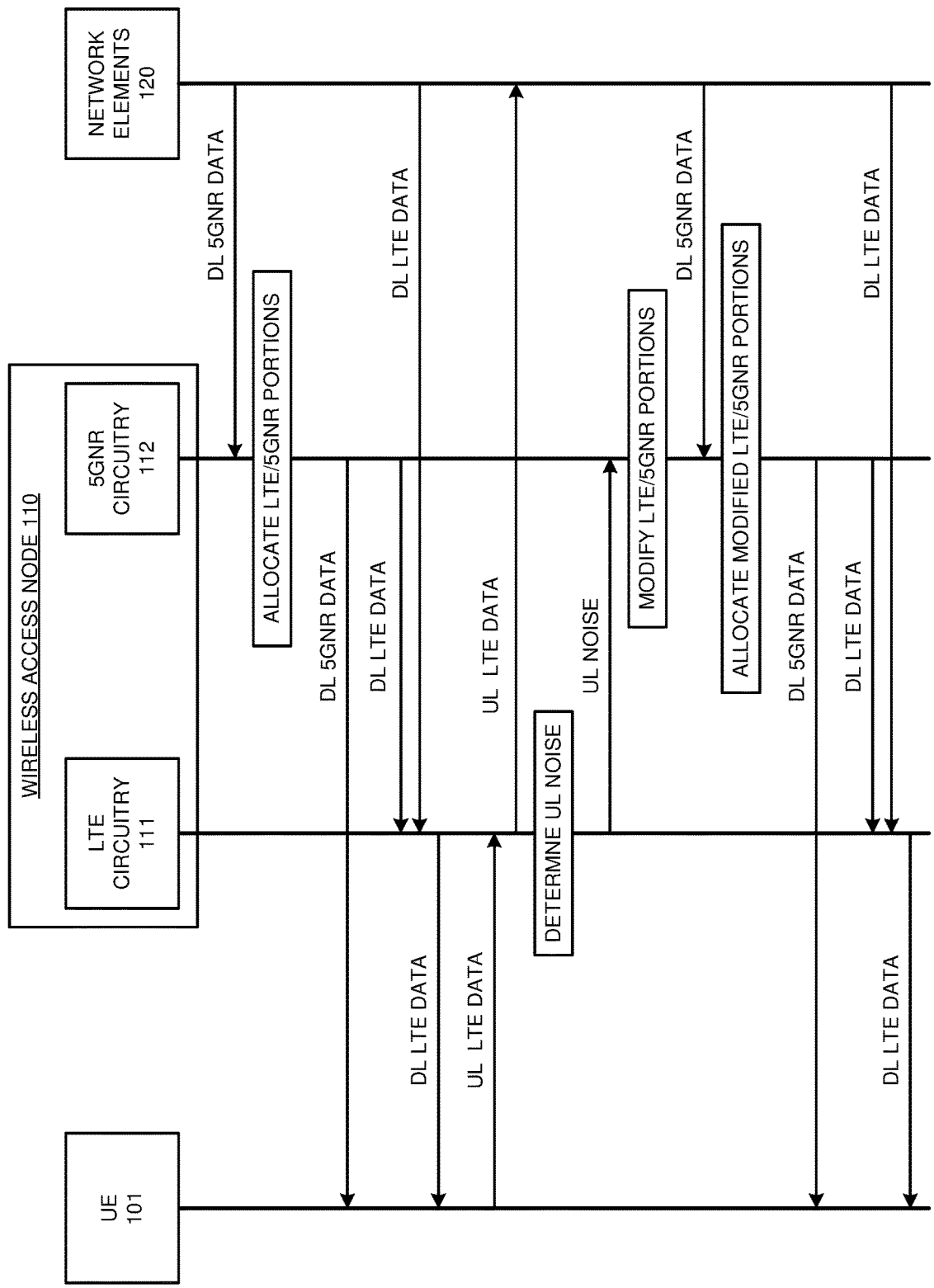
FIG. 3 illustrates the operation of the wireless communication network to simultaneously serve the UEs over 5GNR and the LTE.

FIG. 3 illustrates the operation of wireless communication network 100 to simultaneously serve UE 101 over 5GNR and LTE. Network elements 120 transfer DL 5GNR data to 5GNR circuitry 112. 5GNR circuitry 112 allocates the DL user data into a 5GNR portion and an LTE portion. 5GNR circuitry 112 wirelessly transfers the 5GNR portion of the DL 5GNR data to UE 101 over wireless 5GNR links. 5GNR circuitry 112 transfers the LTE portion of the DL 5GNR data to LTE circuitry 111 over network links. Network elements 120 transfer DL LTE data to LTE circuitry 111. LTE circuitry 111 wirelessly transfers DL LTE data that includes the LTE portion of the DL 5GNR data to UE 101 over wireless LTE links.

UE transfers UL LTE data to LTE circuitry 111, and LTE circuitry 111 transfers the UL user data to network elements 120. LTE circuitry 111 determines an UL noise metric for wireless access node 110 and signals the UL noise metric to 5GNR circuitry 112. 5GNR circuitry 112 modifies the 5GNR portion and the LTE portion based on the UL noise metric. Network elements 120 transfer additional DL 5GNR data to 5GNR circuitry 112. 5GNR circuitry 112 allocates the additional DL 5GNR data into a modified 5GNR portion and a modified LTE portion based on the modified allocation. 5GNR circuitry 112 wirelessly transfers the modified 5GNR portion of the DL user data to UE 101 over the 5GNR links. 5GNR circuitry 112 transfers the modified LTE portion of the DL user data to LTE circuitry 111 over the network links. Network elements 120 transfer additional DL LTE data to LTE circuitry 111. LTE circuitry 111 wirelessly transfers additional DL LTE data to UE 101 that includes the modified LTE portion of the additional DL 5GNR data.

Figure 4:
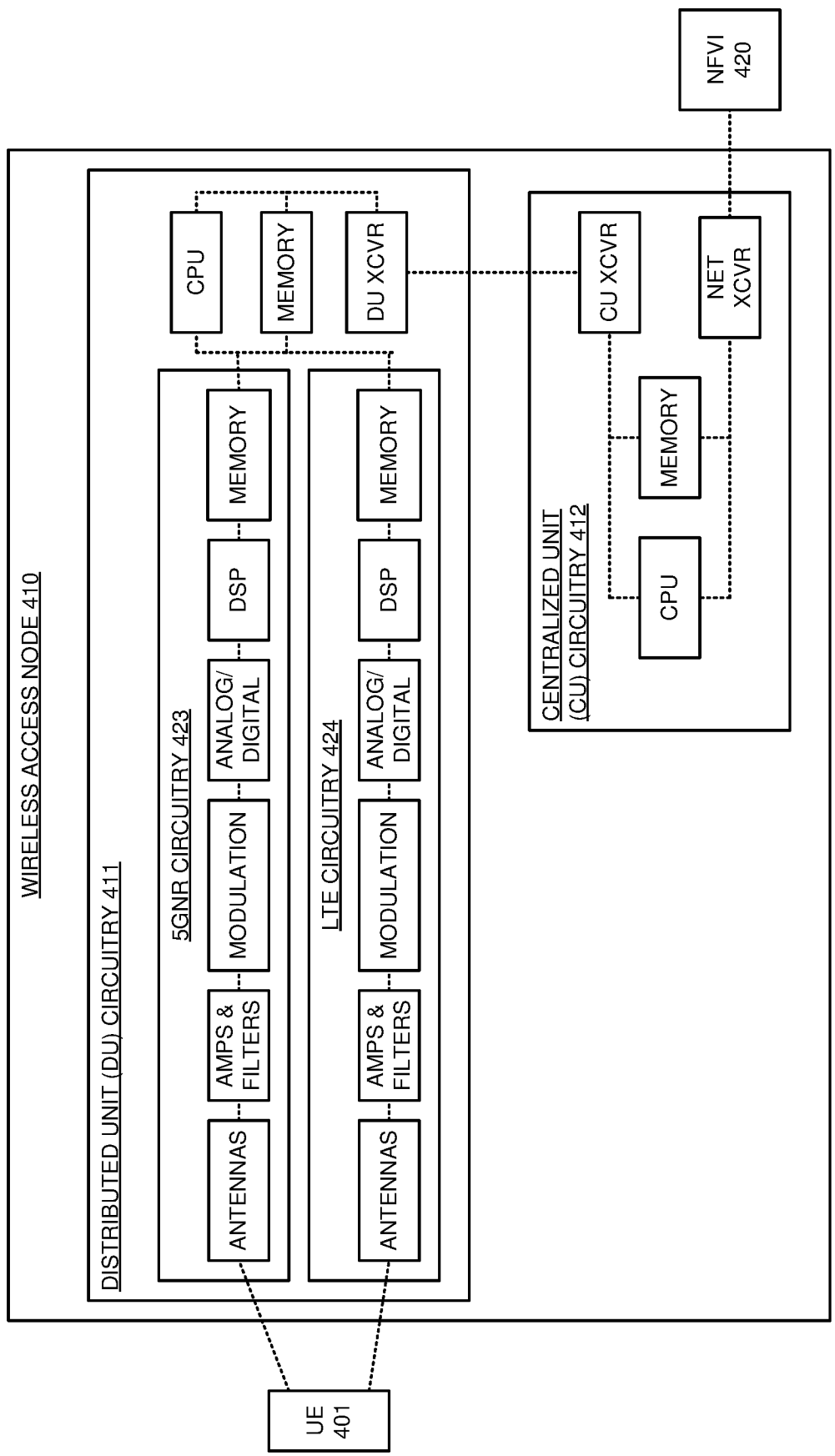
FIG. 4 illustrates a wireless access node to simultaneously serve UEs over 5GNR and LTE.

FIG. 4 illustrates wireless access node 410 to simultaneously serve UE 401 over 5GNR and LTE. Wireless access node 410 is an example of wireless access node 110, although access node 110 may differ. Wireless access node 410 comprises Distributed Unit (DU) circuitry 411 and Centralized Unit (CU) circuitry 412. DU circuitry 411 comprises 5GNR circuitry 423, LTE circuitry 424, Central Processing Units (CPU), memory, and transceivers (DU XCVR) that are coupled over bus circuitry. Circuitry 423-424 comprises antennas, amplifiers (AMPS), filters, modulation, analog-to-digital interfaces, Digital Signal Processors (DSP), and memory that are coupled over bus circuitry. Circuitry 423-424 may share some radio components. CU circuitry 412 comprises CPU, memory, and transceivers that are coupled over bus circuitry. UE 401 is wirelessly coupled to the antennas in circuitry 423-424 over wireless LTE and 5GNR links. The DU transceivers in DU circuitry 411 are coupled to the CU transceivers in CU circuitry 412 over network data links. The network transceivers in CU circuitry 412 are coupled to Network Function Virtualization Infrastructure (NFVI) 420 over network data links.

In DU circuitry 411, the memories store operating systems and network applications. The network applications include at least some of: Physical Layer (PHY), Media Access Control (MAC), Radio Link Control (RLC), Packet Data Convergence Protocol (PDCP), Radio Resource Control (RRC), Service Data Adaptation Protocol (SDAP), and Common Public Radio Interface (CPRI). In CU circuitry 412, the memories store operating systems, virtual components, and network applications. The virtual components comprise hypervisor modules, virtual switches, virtual machines, and/or the like. The network applications comprise PHY, MAC, RLC, PDCP, RRC, SDAP, and CPRI. For 5GNR, the CPU in DU circuitry 411 executes some or all of the 5GNR network applications to drive the transfer of 5GNR data to UE 401, and the CPU in CU circuitry 412 executes some or all of the 5GNR network applications to drive the receipt of 5GNR data from NFVI 420. The functionality split of the 5GNR network applications between DU circuitry 411 and CU circuitry 412 may vary. For LTE, the CPU in DU circuitry 411 executes a CPRI application, and CU circuitry 412 executes the LTE network applications to drive the exchange of LTE data between UE 401 and NFVI 420.

In LTE circuitry 424, the antennas receive wireless signals from UE 401 that transport UL LTE signaling and user data. The antennas transfer corresponding electrical UL signals through duplexers to the amplifiers. The amplifiers boost the received UL signals for filters which attenuate unwanted energy. In modulation, demodulators down-convert the UL signals from their carrier frequencies. The analog/digital interfaces convert the analog UL signals into digital UL signals for the DSP. The DSP recovers UL LTE symbols from the UL digital signals. In DU circuitry 411, the CPRI application and the DU transceivers transfer the UL LTE symbols to CU circuitry 412.

In CU circuitry 412, the CPUs execute the LTE network applications to process the UL LTE symbols and recover the UL LTE signaling and user data. In CU circuitry 412, the network transceivers receive Downlink (DL) LTE signaling and user data from NFVI 420 for LTE circuitry 423 and transfer the DL LTE signaling and user data to memory. The CPU in CU circuitry 412 executes the LTE network applications to process the UL LTE signaling and the DL LTE signaling to generate new UL LTE signaling and new DL LTE signaling. The CPU also executes the LTE network applications to determine UL noise at wireless access node 410 and indicate the UL noise to the 5GNR PDCP. In CU circuitry 412, the network transceivers transfer the new UL LTE signaling and user data to NFVI 420. In CU circuitry 411, the LTE network applications process the new DL LTE signaling and user data to generate new DL LTE symbols that carry the new DL LTE signaling and user data. The CU transceiver transfers the new DL LTE symbols to the DU transceiver.

In LTE circuitry 424, the DSP processes the DL LTE symbols to generate corresponding digital signals for the analog-to-digital interfaces. The analog-to-digital interfaces convert the digital DL signals into analog DL signals for modulation. Modulation up-converts the DL signals to their carrier frequencies. The amplifiers boost the modulated DL signals for the filters which attenuate unwanted out-of-band energy. The filters transfer the filtered DL signals through duplexers to the antennas. The electrical DL signals drive the antennas to emit corresponding wireless LTE signals that transport the DL LTE signaling and user data to UE 401.

In CU circuitry 412, the network transceivers receive DL 5GNR data from NFVI 420 and transfer the DL user data to memory. In CU circuitry 412 and/or DU circuitry 411, the CPUs execute the 5GNR network applications to determine an LTE portion and a 5GNR portion of the DL 5GNR data based on the UL noise for wireless access node 410. In CU circuitry 412 and/or DU circuitry 411, the CPUs execute the 5GNR network applications to transfer the LTE portion of the DL 5GNR data to the LTE applications (typically from the 5GNR PDCP to the LTE RLC). In CU circuitry 412 and/or DU circuitry 411, the CPUs execute the 5GNR network applications to generate DL 5GNR symbols that carry the 5GNR portion of the DL user data.

In 5GNR circuitry 423, the DSP processes the DL 5GNR symbols for the 5GNR data portion to generate corresponding digital signals for the analog-to-digital interfaces. The analog-to-digital interfaces convert the digital DL signals into analog DL signals for modulation. Modulation up-converts the DL signals to their carrier frequencies. The amplifiers boost the modulated DL signals for the filters which attenuate unwanted out-of-band energy. The filters transfer the filtered DL signals through duplexers to the antennas. The electrical DL signals drive the antennas to emit corresponding wireless 5GNR signals that transport the DL user data to UE 401 over 5GNR links.

In LTE circuitry 424, the DSP processes the DL LTE symbols for the LTE portion of the DL 5GNR data to generate corresponding digital signals for the analog-to-digital interfaces. The analog-to-digital interfaces convert the digital DL signals into analog DL signals for modulation. Modulation up-converts the DL signals to their carrier frequencies. The amplifiers boost the modulated DL signals for the filters which attenuate unwanted out-of-band energy. The filters transfer the filtered DL signals through duplexers to the antennas. The electrical DL signals drive the antennas to emit corresponding wireless LTE signals that transport the LTE portion of the DL 5GNR data to UE 401.

The RRC maps between network signaling/user data and Service Data Units (SDUs). The RRC exchanges the SDUs with the LTE PDCP. The LTE PDCP and the 5GNR PDCP map between the SDUs and PDUs. The PDCPs exchanges their PDUs with the RLCs. In particular, the 5GNR PDCP receives user data from NFVI 420 and transfers PDUs to the LTE RLC that carry the LTE portion of the DL user data. The RLCs map between the PDUs and MAC logical channels. The RLCs exchanges the network signaling and user data with the MACs over the MAC logical channels. The MACs map between the MAC logical channels and MAC transport channels. The MACs exchanges the network signaling and user data with the PHYs over the MAC transport channels. The PHYs maps between the MAC transport channels and PHY transport channels. The PHYs exchange the network signaling and user data with the PHYs in the UE 401 over the PHY transport channels in the wireless links.

RRC functions comprise authentication, security, handover control, status reporting, Quality-of-Service (QoS), network broadcasts and pages, and network selection. SDAP functions comprise QoS marking and flow control. PDCP functions comprise LTE/5GNR allocations, security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid Automatic Repeat Request (HARM), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

Figure 5:
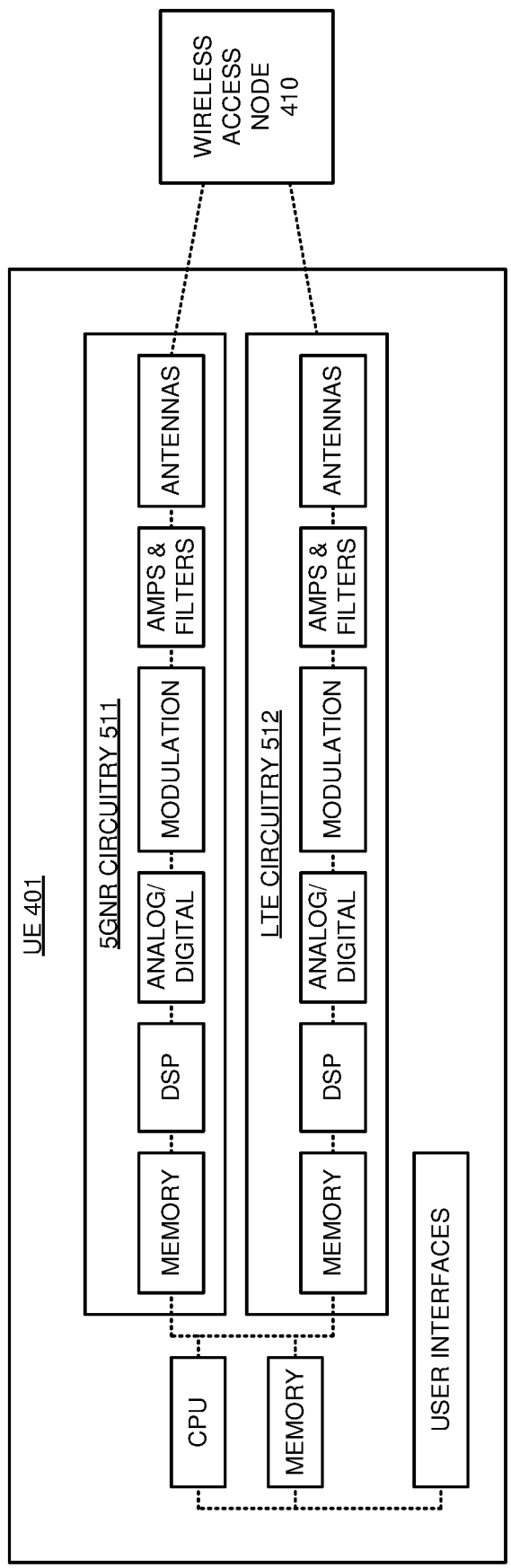
FIG. 5 illustrates a UE that is simultaneously served by wireless access nodes over 5GNR and LTE.

FIG. 5 illustrates UE 401 that is served by wireless access node 410 over 5GNR and LTE. UE 401 is an example of UE 101, although UE 101 may differ. UE 401 comprises 5GNR circuitry 511, LTE circuitry 512, CPU, memory, and user interfaces which are interconnected over bus circuitry. Circuitry 511-512 comprises antennas, amplifiers, filters, modulation, analog-to-digital interfaces, DSP, and memory that are coupled over bus circuitry. The antennas in UE 401 are coupled to wireless access node 410 over wireless 5GNR and LTE links. The user interfaces comprise graphic displays, machine controllers, sensors, cameras, transceivers, and/or some other user components. The memories store operating systems, user applications, and network applications. The network applications comprise PHY, MAC, RLC, PDCP, RRC, and SDAP. The CPU executes the operating systems, user applications, and network applications to exchange network signaling and user data with wireless access node 410 over circuitry 511-512 and the wireless links.

Figure 6:
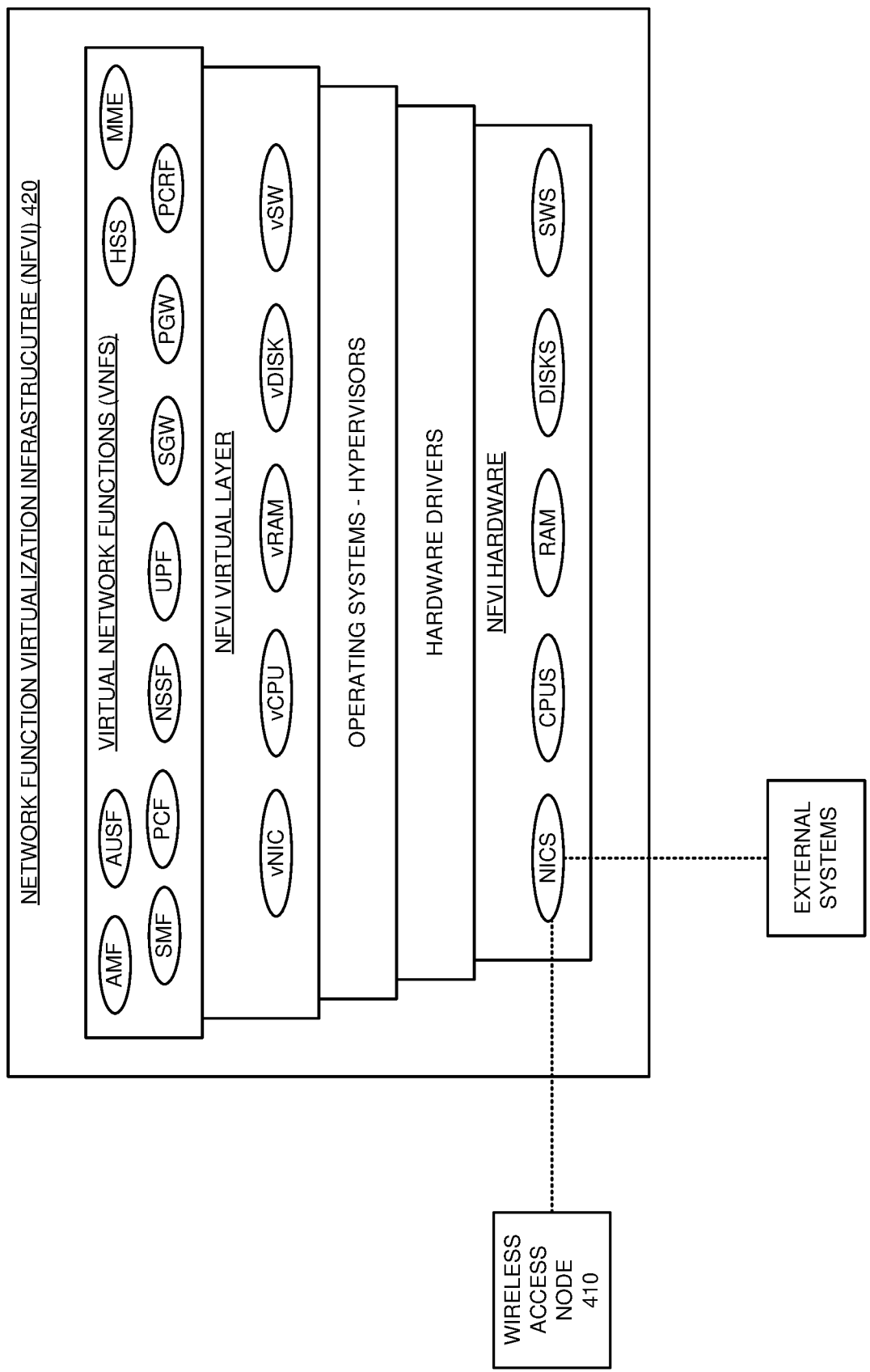
FIG. 6 illustrates a Network Function Virtualization Infrastructure (NFVI) to simultaneously serve UEs over 5GNR and LTE.

FIG. 6 illustrates Network Function Virtualization Infrastructure (NFVI) 420 to simultaneously serve UE 401 over 5GNR and LTE. NFVI 420 is an example of network elements 120, although elements 120 may differ. NFVI 420 comprises NFVI hardware, hardware drivers, operating systems and hypervisors, NFVI virtual layer, and Virtual Network Functions (VNFs). The NFVI hardware comprises Network Interface Cards (NICs), CPUs, RAM, disk storage, and data switches. The virtual layers comprise virtual NICs (vNIC), virtual CPUs (vCPU), virtual RAM (vRAM), virtual Disk Storage (vDISK), and virtual Switches (vSW). The VNFs comprise wireless network elements like Access and Mobility Management Function (AMF), Session Management Function (SMF), Policy Control Function (PCF), Authentication and Security Function (AUSF), Network Slice Selection Function (NSSF), User Plane Function (UPF), Mobility Management Entity (MME), Home Subscriber System (HSS), Serving Gateway (SGW), Packet Data Network Gateway (PGW), Policy Charging Rules Function (PCRF), or some other networking systems. The NFVI hardware executes the hardware drivers, operating systems/hypervisors, virtual layers, and VNFs to simultaneously serve UE 401 over LTE and 5GNR.

Figure 7:
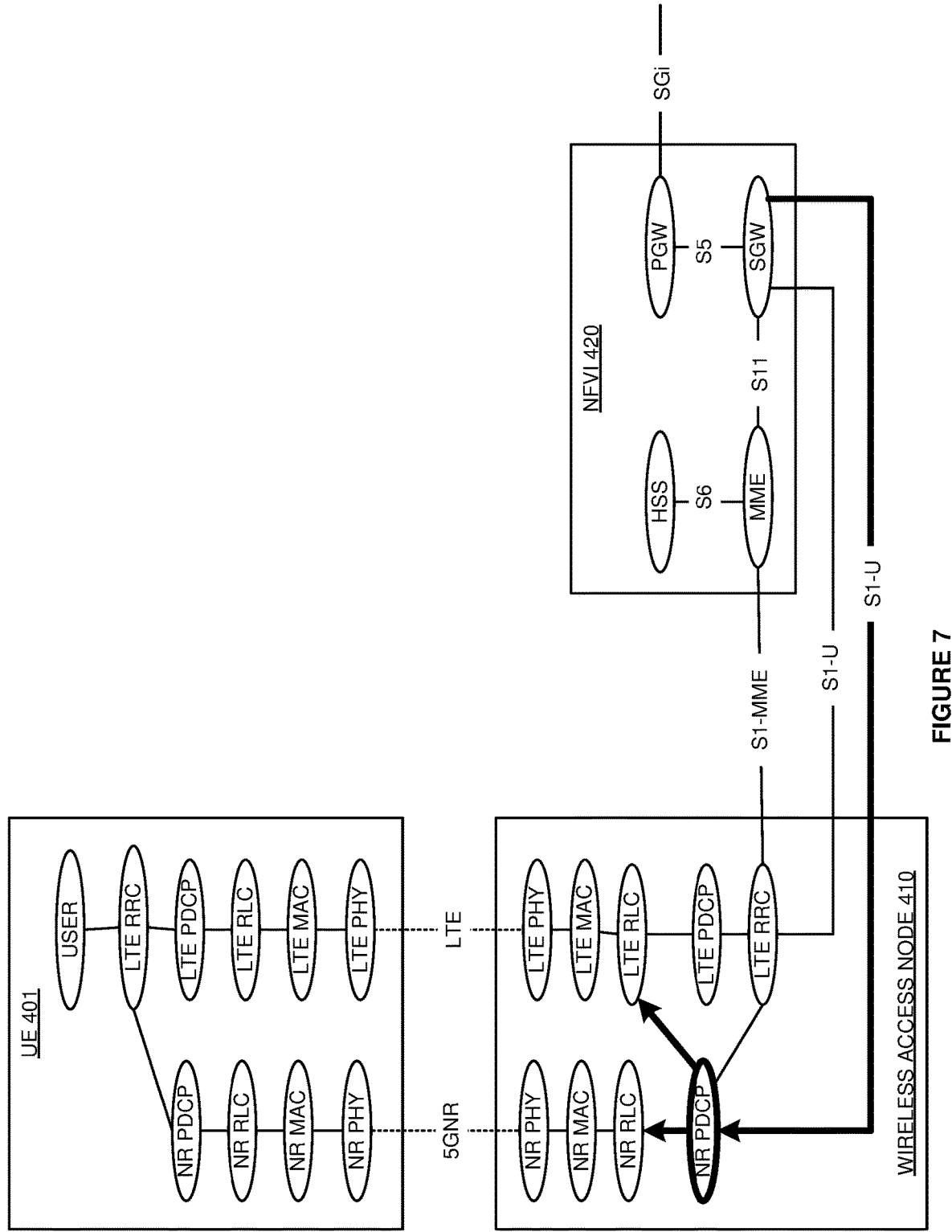
FIG. 7 illustrates the operation of the UE, wireless access node, and NFVI with LTE network elements to simultaneously serve the UEs over 5GNR and LTE.

FIG. 7 illustrates the operation of UE 401, wireless access node 410, and NFVI 420 to simultaneously serve UE 401 over 5GNR and LTE using an LTE core. The LTE RRC in UE 401 and the LTE RRC in access node 410 exchange attachment signaling over their respective PDCP, RLC, MAC, and PHY. The LTE RRC in access node 410 transfers attachment signaling like an Initial UE Message for UE 401 to the MME. The attachment signaling indicates simultaneous LTE/5GNR capability for UE 401.

The MME receives the attachment signaling and exchanges Non-Access Stratum (NAS) data with the RRC in UE 401 over access node 410 to perform UE authentication and UE security. The MME transfers a database request like an Update Location Request to the HSS that indicates a UE ID and the simultaneous LTE/5GNR capability for UE 401. The HSS authorizes UE 401 for simultaneous LTE/5GNR service. The HSS also yields one or more Access Point Names (APNs). The MME exchanges signaling with the SGW which exchanges signaling with the PGW. The PGW exchanges signaling with the PCRF that indicates the UE ID, APNs, simultaneous LTE/5GNR capability, and/or some other networking data. The PCRF selects one or more Quality-of-Service Class Indicators (QCIs) based on the signaling, and the selected QCI(s) are transferred back to the MME over the PGW and SGW. The MME transfers response signaling like an Initial Context Set-up Request to the LTE RRC in wireless access node 410 that indicates the network-selected APNs, QCIs, and the UE 401 authorization for simultaneous LTE/5GNR service.

The LTE RRC in access node 410 receives the response signaling and configures its LTE network applications to communicate with UE 401. The LTE RRC in access node 410 signals the 5GNR PDCP in access node 410 to configures its 5GNR network applications to communicate with UE 401. The LTE RRC in access node 410 transfers connection signaling like an RRC Connection Reconfiguration message to the RRC in UE 401 over their respective PDCP, RLC, MAC, and PHY that indicates the connection information. In UE 401, the LTE RRC configures its LTE network applications to communicate with access node 410. In UE 401, the LTE RRC signals the 5GNR PDCP to configure its 5GNR network applications to communicate with access node 410. The LTE RRC in access node 410 transfers connection signaling to the MME like Attach Complete/Bearer Accept NAS messaging. The MME directs the SGW to modify bearers that serve UE 401.

The PGW exchanges UL/DL user data for UE 401 with external systems and with the SGW. The SGW exchanges some of the UL/DL user data with the LTE RRC in wireless access node 410. The LTE RRC in access node 410 and the LTE RRC in UE 401 exchange this UL/DL user data over their respective PDCP, RLC, MAC, and PHY. In wireless access node 120, the LTE PHY and MAC determine UL noise and signal the UL noise values to the 5GNR PDCP.

The SGW also transfers some of the DL user data to the 5GNR PDCP in wireless access node 410. The 5GNR PDCP determines an LTE portion and a 5GNR portion of the DL user data based on the UL noise values. The 5GNR PDCP transfers the LTE portion of the DL user data to the LTE RLC in wireless access node 410. The LTE RLC in wireless access node 410 transfers the LTE portion of the DL user data to the LTE RRC in UE 401 which forwards the DL user data to the user applications. The 5GNR PDCP transfers the 5GNR portion of the DL user data to the 5GNR RLC in wireless access node 410. The 5GNR RLC in wireless access node 410 transfers the 5GNR portion of the DL user data to the 5GNR PDCP in UE 401. The 5GNR PDCP in UE 401 forwards the DL user data to the user applications over the LTE RRC.

Figure 8:
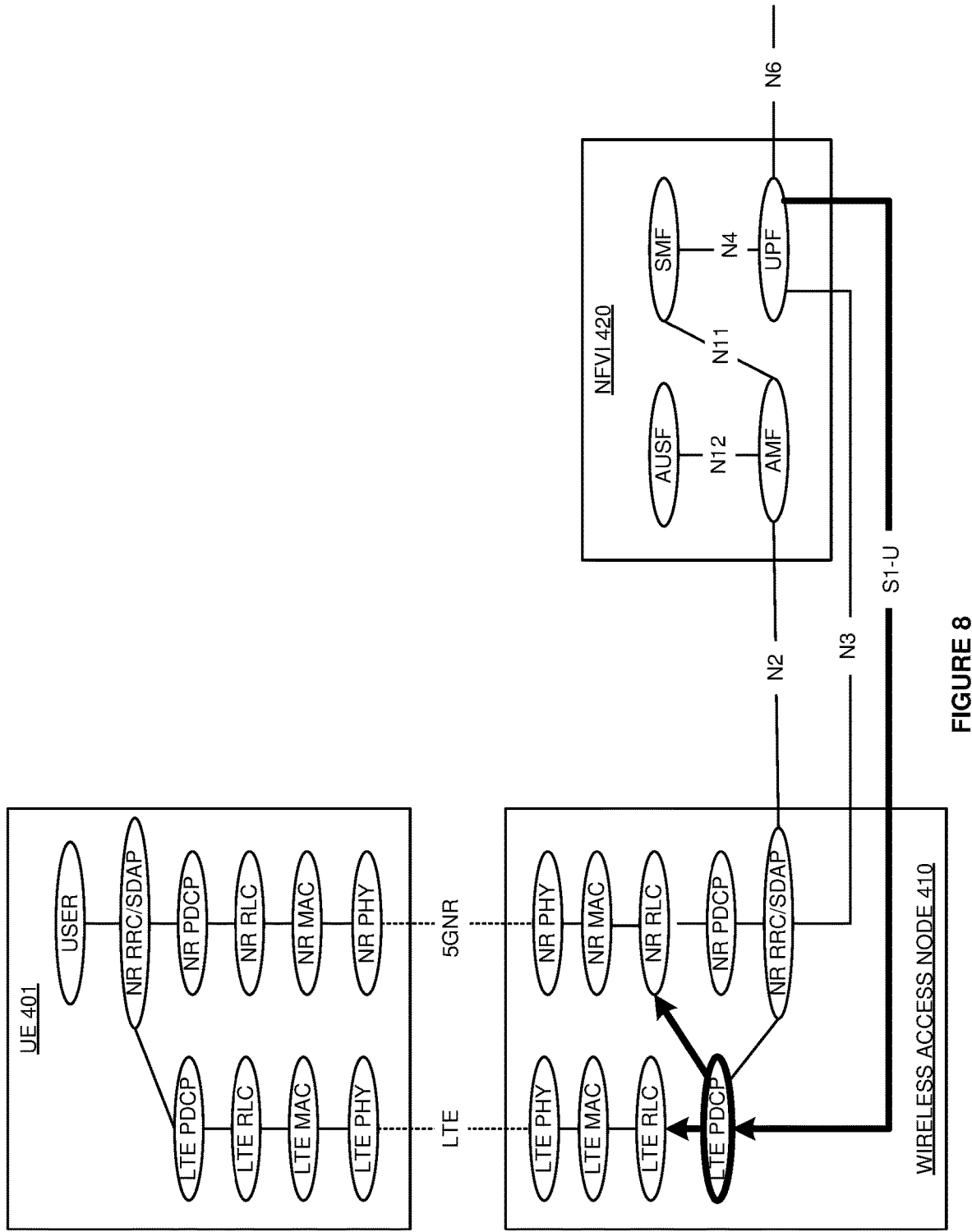
FIG. 8 illustrates the operation of the UE, wireless access node, and NFVI with Fifth Generation Core (5GC) network elements to simultaneously serve the UEs over 5GNR and LTE.

FIG. 8 illustrates the operation of UE 401, wireless access node 410, and NFVI 420 to simultaneously serve UE 401 over 5GNR and LTE using a 5G core. The 5GNR RRC in UE 401 and the 5GNR RRC in access node 410 exchange attachment signaling over their respective PDCP, RLC, MAC, and PHY. The 5GNR RRC in access node 410 transfers attachment signaling like an Initial UE Message for UE 401 to the AMF. The attachment signaling indicates simultaneous LTE/5GNR capability for UE 401.

The AMF receives the attachment signaling and exchanges N1 data with the RRC in UE 401 over access node 410 to perform UE authentication and UE security. The AMF transfers a database request to the AUSF that indicates a UE ID and the simultaneous LTE/5GNR capability for UE 401. The AUSF authorizes UE 401 for simultaneous LTE/5GNR service. The AMF exchanges signaling with the SMF which exchanges signaling with the UPF. The AMF transfers response signaling to the 5GNR RRC in wireless access node 410 that indicates the authorization for simultaneous LTE/5GNR service.

The 5GNR RRC in access node 410 receives the response signaling and configures its 5GNR network applications to communicate with UE 401. The 5GNR RRC in access node 410 signals the LTE PDCP in access node 410 to configure its LTE network applications to communicate with UE 401. The 5GNR RRC in access node 410 transfers connection signaling to the 5GNR RRC in UE 401 over their respective PDCP, RLC, MAC, and PHY that indicates the connection information. In UE 401, the 5GNR RRC configures its 5GNR network applications to communicate with access node 410. In UE 401, the 5GNR RRC signals the LTE PDCP to configure its LTE network applications to communicate with access node 410. The 5GNR RRC in access node 410 transfers connection signaling to the AMF, and the SMF correspondingly directs the UPF to modify bearers that serve UE 401.

The UPF exchanges UL/DL user data for UE 401 with external systems. The UPF exchanges some of the UL/DL user data with the 5GNR SDAP in wireless access node 410. The 5GNR SDAP in access node 410 and the 5GNR SDAP in UE 401 exchange the user data over their respective PDCP, RLC, MAC, and PHY. In wireless access node 410, the 5GNR PHY and MAC determine UL noise and signal the UL noise values to the LTE PDCP.

The UPF transfers some of the DL user data to the LTE PDCP in wireless access node 410. The LTE PDCP in access node 410 determines an LTE portion and a 5GNR portion of the DL user data based on the UL noise values. The LTE PDCP transfers the 5GNR portion of the DL user data to the 5GNR RLC. The 5GNR RLC in wireless access node 410 transfers the 5GNR portion of the DL user data to the 5GNR SDAP in UE 401 which forwards the DL user data to the user applications. The LTE PDCP transfers the LTE portion of the DL user data to the LTE RLC. The LTE RLC in wireless access node 410 transfers the LTE portion of the DL user data to the LTE PDCP in UE 401 which forwards the DL user data to the user applications over the 5GNR SDAP.

The wireless data network circuitry described above comprises computer hardware and software that form special-purpose wireless network circuitry to simultaneously serve UEs over 5GNR and LTE. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose wireless network circuitry to simultaneously serve UEs over 5GNR and LTE.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless access node to serve User Equipment (UE), the method comprising:
   first Media Access Control (MAC) circuitry measuring uplink noise and indicating the uplink noise to Packet Data Convergence Protocol (PDCP) circuitry;
   the PDCP circuitry identifying a noise metric for the wireless access node, receiving user data for delivery to the UE, allocating a first portion of the DL data and a second portion of the DL data based on the noise metric, transferring the first portion of the DL data over first Radio Link Control (RLC) circuitry to the first MAC circuitry, and transferring the second portion of the DL data over second RLC circuitry to second MAC circuitry;
   the first MAC circuitry receiving the first portion of the DL data over the first RLC circuitry, scheduling wireless delivery of the first portion of the DL data, and transferring the first portion of the DL data to the UE over first Physical Layer (PHY) circuitry per the first MAC circuitry scheduling; and
   the second MAC circuitry receiving the second portion of the DL data over the second RLC circuitry, scheduling wireless delivery of the second portion of the DL data, and transferring the second portion of the DL data to the UE over second PHY circuitry per the second MAC circuitry scheduling.

2. The method of claim 1 wherein the noise metric comprises the uplink noise.

3. The method of claim 1 wherein the PDCP circuitry comprises Fifth Generation New Radio (5GNR) PDCP circuitry.

4. The method of claim 1 wherein the PDCP circuitry comprises Long Term Evolution (LTE) PDCP circuitry.

5. The method of claim 1 wherein the first MAC circuitry comprises Fifth Generation New Radio (5GNR) MAC circuitry.

6. The method of claim 1 wherein the first MAC circuitry comprises Long Term Evolution (LTE) MAC circuitry.

7. The method of claim 1 wherein the first MAC circuitry measuring the uplink noise and indicating the uplink noise to the PDCP circuitry comprises the first MAC circuitry and the first PHY circuitry measuring the uplink noise and indicating the uplink noise to the PDCP circuitry.

8. The method of claim 1 wherein the first PHY circuitry comprises Fifth Generation New Radio (5GNR) PHY circuitry.

9. The method of claim 1 wherein the PDCP circuitry comprises a Centralized Unit (CU).

10. The method of claim 1 wherein the first MAC circuitry comprises a Distributed Unit (DU).

11. A wireless access node to serve User Equipment (UE), the wireless access node comprising:
    first Media Access Control (MAC) circuitry configured to measure uplink noise and indicate the uplink noise to Packet Data Convergence Protocol (PDCP) circuitry;
    the PDCP circuitry configured to identify a noise metric for the wireless access node, receive user data for delivery to the UE, allocate a first portion of the DL data and a second portion of the DL data based on the noise metric, transfer the first portion of the DL data over first Radio Link Control (RLC) circuitry to the first MAC circuitry, and transfer the second portion of the DL data over second RLC circuitry to second MAC circuitry;
    the first MAC circuitry configured to receive the first portion of the DL data over the first RLC circuitry, schedule wireless delivery of the first portion of the DL data, and transfer the first portion of the DL data to the UE over first Physical Layer (PHY) circuitry per the first MAC circuitry scheduling; and
    the second MAC circuitry configured to receive the second portion of the DL data over the second RLC circuitry, schedule wireless delivery of the second portion of the DL data, and transfer the second portion of the DL data to the UE over second PHY circuitry per the second MAC circuitry scheduling.

12. The wireless access node of claim 11 wherein the noise metric comprises the uplink noise.

13. The wireless access node of claim 11 wherein the PDCP circuitry comprises Fifth Generation New Radio (5GNR) PDCP circuitry.

14. The wireless access node of claim 11 wherein the PDCP circuitry comprises Long Term Evolution (LTE) PDCP circuitry.

15. The wireless access node of claim 11 wherein the first MAC circuitry comprises Fifth Generation New Radio (5GNR) MAC circuitry.

16. The wireless access node of claim 11 wherein the first MAC circuitry comprises Long Term Evolution (LTE) MAC circuitry.

17. The wireless access node of claim 11 wherein the first MAC circuitry is configured to measure the uplink noise and indicate the uplink noise to the PDCP circuitry comprises the first MAC circuitry and the first PHY circuitry configured to measure uplink noise and indicate the uplink noise to the PDCP circuitry.

18. The wireless access node of claim 11 wherein the first PHY circuitry comprises Fifth Generation New Radio (5GNR) PHY circuitry.

19. The wireless access node of claim 11 wherein the PDCP circuitry comprises a Centralized Unit (CU).

20. The wireless access node of claim 11 wherein the first MAC circuitry comprises a Distributed Unit (DU).

* * * * *